2,993,942
POLYMERIZED ETHYLENE LUBRICATING OILS

Herschel T. White, Montclair, and Anthony J. Passannante, Metuchen, N.J., assignors to Esso Research and Engineering Company, a corporation of Delaware
No Drawing. Filed Dec. 8, 1958, Ser. No. 778,614
3 Claims. (Cl. 260—683.15)

This invention relates to an improved method of preparing high viscosity index lubricating oils. More particularly it relates to polymerizing ethylene to obtain oils of that nature utilizing specific catalysts, temperature and diluent controls.

The low pressure polymerization and copolymerization of alpha olefins and diolefins with catalyst systems made up of a partially reduced, heavy, transition metal halide and a reducing metal-containing compound to high density, often isotactic, high molecular weight, solid relatively linear products has been assuming ever increasing importance and is now well known.

It has now surprisingly been found that hydrocarbon oils having a minimum viscosity index of 140 and a molecular weight in the range of 350 to 800 can be prepared by polymerizing ethylene with controlled catalysts, diluents and under controlled temperatures. The catalyst consists of a transition metal halide and a halogenated aluminum alkyl compound. The temperatures employed are below 30° C. and a halogenated aromatic diluent also must be used. All of these factors in combination are necessary in order to obtain selectively the oil products which are described above.

Ethylene is unique in the instant invention in that other olefins do not respond to give similar products.

The catalysts are solid, soluble, heavy, transition metal halide of a group IV-B to VI-B or VIII metal with a halogenated aluminum alkyl compound having the formula $$AlR_nX_{3-n}$$

$n$ representing a number of at least 1 but less than 2. Preferred transition metal halides include materials such as $TiCl_4$, $ZrCl_4$, $VCl_5$, etc. It is also possible to start with a reduced heavy, transition metal halide such as $TiCl_3$.

The formula of halogenated aluminum alkyl compound has been presented above. The $n$ can represent average values since aluminum sesqui-chloride (a mixture of aluminum diethyl chloride and aluminum ethyl dichloride) is preferred in many instances. It is essential that these halogenated derivatives be employed as contrasted to the hydrocarbon aluminum derivatives such as aluminum triethyl, aluminum triisobutyl, etc. The amount of solid polymer increases as the value of $n$ goes from 1 to 2. An especially effective compound for use is aluminum ethyl dichloride. The molar ratio of aluminum compound to transition metal halide compound can be in the range of 0.1 to 20, preferably 2 to 4.

The use of these halogenated aluminum derivatives appears to be important for another reason. These compounds apparently control the amount of branching introduced into the polymer product so as to obtain those having branching configurations consistent with the required viscosity index. Thus non-halogenated aluminum derivatives result in the production of linear solid materials. Conversely, excessive Lewis acidity results in excessive branching and isomerization so that the desired products are not obtained.

The temperatures employed are below 30° C. and preferably a temperature of −10 to +15° C. is utilized. The reaction is carried out by mixing in the proper proportions solutions of the two catalyst components in the halogenated aromatic diluent, preferably $C_6H_5Cl$, at temperatures <25° C. and in the absence of moisture, oxygen, and sulfur impurities. The resulting Ti halide/Al alkyl halide/ diluent coordination complex probably constitutes the active polymerization catalyst. The pressure utilized is in the range of 7 to 30 p.s.i.g. The selectivity to liquid product drops off above the maximum temperature.

The polymerization must be carried out in the presence of a halogenated aromatic hydrocarbon diluent preferably a dichlorobenzene or monochlorobenzene. The use of aliphatic chlorinated solvents results in lower efficiencies and excessive branching. The halogenated aromatic hydrocarbons can be used alone or in conjunction with other diluents such as heptane, benzene, xylene, etc. provided that the halogenated aromatic material comprises a minimum of 40 vol. percent of the total diluent mixture.

The oils of this invention boil in the range of 400 to 650° C. They have a minimum viscosity index of 140 and a molecular weight in the range of 350 to 800.

This invention and its advantages will be better understood by reference to the following examples.

Example 1

Ethylene was polymerized with a $TiCl_4$/halogenated aluminum alkyl at a temperature of 15° C. utilizing a monochlorobenzene diluent. The results follow:

[Chlorobenzene diluent; .010 mole Ti/liter; 15° C.]

| Species | | Liq. Prod. Yield, Wt. percent on reacted $C_2H_4$ |
|---|---|---|
| Al | Ti | |
| $AlEtCl_2$ | $TiCl_4$ | 98 |
| $AlEt_2Cl$ | $TiCl_4$ | <26 |
| $AlEt_{1.5}Cl_{1.5}$ | $TiCl_4$ | 95 |

These data show how the yield of liquid product decreases from the use of the monoethyl to diethyl derivatives

Example 2

An example was run to show the effects of temperature. The results were as follows:

| Catalyst | Diluent | Temp., ° C. | Liq. Prod. Yield, Wt. Percent on reacted $C_2H_4$ |
|---|---|---|---|
| $AlEt_{1.4}Cl_{1.6}/TiCl_4$ | $C_6H_5Cl$ | 0 | 100 |
| $AlEt_{1.4}Cl_{1.6}/TiCl_4$ | $C_6H_5Cl$ | 15 | 78 |
| $AlEt_{1.4}Cl_{1.6}/TiCl_4$ | $C_6H_5Cl$ | 25 | 0 |

These results show the adverse effects of exceeding 15° C.

Example 3

The following data demonstrate the necessity for halogenated diluents in general and halogenated aromatics in particular.

| Diluent | Liq. Prod. Yield, Wt. Percent on reacted $C_2H_4$ | Non-liquid Product | Reaction Rate, Rel. |
|---|---|---|---|
| $C_6H_5Cl$ | 100 | | 1.00 |
| Octene-1 | 0 | 700/2,000 M.W. Wax | 0.1 |
| n-Heptane | 0 | >20,000 M.W. Solid | 0.01 |
| $CHCl_3$ | 100 | | 0.2 |

Example 4

The viscosity index of polyethylene oils increases with increasing polymer linearity. The following results indicate the effect of the catalyst system on polymer structure and consequently polymer properties such as V.I.

| Catalyst | Diluent | Linearity Index (500 av. M.W. oil) |
|---|---|---|
| AlEtCl$_2$/TiCl$_4$ | C$_6$H$_5$Cl | 6 |
| AlEt$_{1.5}$Cl$_{1.5}$/TiCl$_4$ | CHCl$_3$ | 3.5-4.5 |
| AlCl$_3$ | C$_6$H$_5$Cl | 2 |

*Example 5*

Olefin-type distribution also serves to characterize the polyethylene oils and indicates that polymers prepared in halogenated aromatic diluents such as chlorobenzene are structurally different from oils prepared in alkyl halide diluents such as chloroform. The results follow:

| Solvent | Vol. Percent of Liquid Product | | |
|---|---|---|---|
| | Type I R—CH=CH$_2$ | Type II H\C=C/R R/ \H | Type III R\C=CH$_2$ R/ |
| C$_6$H$_5$Cl | 20 | 20 | 60 |
| CHCl$_3$ | 20 | 60 | 20 |

The products of this invention are useful as motor lube base stocks, hydraulic transmission fluids, synthetic jet engine oils and bright stocks, among others. These products can also be hydrogenated without any diminution in viscosity index.

The advantages of this invention will be apparent to the skilled in the art. Useful oils are prepared in an efficient and economic manner.

It is to be understood that this invention is not limited to the specific examples which have been offered merely as illustrations and that modifications may be made without departing from the spirit of the invention.

What is claimed is:

1. A method of preparing a hydrocarbon oil having a minimum viscosity index above 140 and a molecular weight in the range of 350 to 800, said oil being suitable for lubricating purposes which comprises polymerizing ethylene in the presence of a catalyst consisting of a titanium halide and an aluminum alkyl compound having the formula AlR$_n$X$_{3-n}$, $n$ representing a number of at least 1 but less than 2 at a temperature in the range of $-10$ to $15°$ C. in the presence of a diluent comprising at least 40 volume percent halogenated aromatic hydrocarbon selected from the group consisting of monochlorobenzene and dichlorobenzene.

2. A method of preparing a hydrocarbon oil having a minimum viscosity index above 140 and a molecular weight in the range of 350 to 800, said oil being suitable for lubricating purposes which comprises polymerizing ethylene in the presence of a catalyst consisting of a titanium halide and an aluminum alkyl compound having the formula AlR$_n$X$_{3-n}$, $n$ representing a number of at least 1 but less than 2 at a temperature in the range of $-10$ to $15°$ C. in the presence of a diluent comprising at least 40 volume percent monochlorobenzene.

3. A method of preparing a hydrocarbon oil having a minimum viscosity index above 140 and a molecular weight in the range of 350 to 800, said oil being suitable for lubricating purposes which comprises polymerizing ethylene in the presence of a catalyst consisting of TiCl$_4$ and aluminum ethyl dichloride at a temperature in the range of $-10$ to $15°$ C. in the presence of a diluent comprising at least 40 volume percent monochlorobenzene.

References Cited in the file of this patent

UNITED STATES PATENTS

| | | |
|---|---|---|
| 2,165,372 | Haag et al. | July 11, 1939 |
| 2,588,425 | Stevens et al. | May 11, 1952 |
| 2,827,447 | Nowlin et al. | Mar. 18, 1958 |
| 2,846,427 | Findlay | Aug. 5, 1958 |
| 2,858,902 | Cottle | Nov. 4, 1958 |
| 2,898,329 | Kittleson | Aug. 4, 1959 |
| 2,907,805 | Bestian et al. | Oct. 6, 1959 |